(No Model.)
J. LAURENT.
LATHE.
No. 269,686.
Patented Dec. 26, 1882.
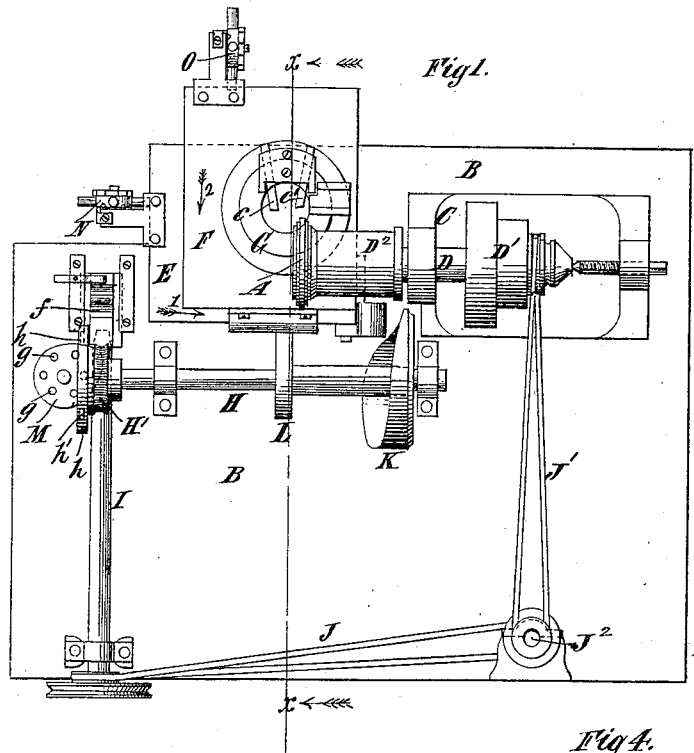
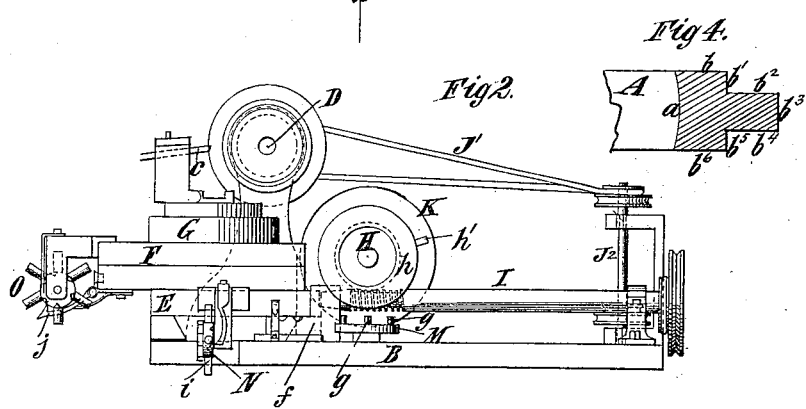
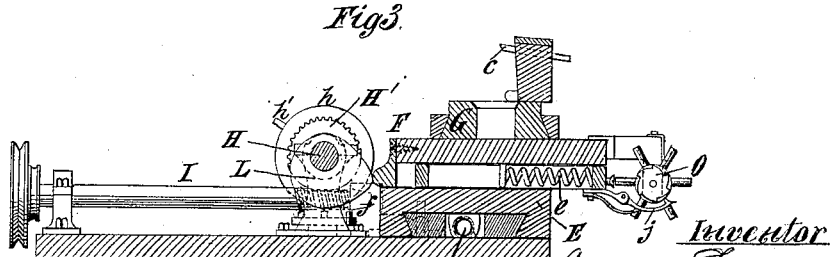
Witnesses.
Fred Haynes
Ed. Moran
Inventor
Jacques Laurent
by his Attorneys
Brown & Brown

UNITED STATES PATENT OFFICE.

JACQUES LAURENT, OF PHILADELPHIA, PENNSYLVANIA.

LATHE.

SPECIFICATION forming part of Letters Patent No. 269,686, dated December 26, 1882.

Application filed March 16, 1882. (No model.)

*To all whom it may concern:*

Be it known that I, JACQUES LAURENT, of the city and county of Philadelphia, in the State of Pennsylvania, have invented certain new and useful Improvements in Lathes, of which the following is a specification.

My invention relates to lathes in which the work is carried by a rotary spindle and two rests; or a compound rest having a movement parallel with and transverse to the spindle is employed to carry the cutter or cutters.

The principal object of my invention is to provide a lathe for turning articles upon which a number of cuts are to be made in different directions, both parallel with and transverse to the rotary spindle carrying the work—such, for instance, as the annular portions of watch-cases—which shall be entirely automatic in its action.

To this end my invention consists essentially in a novel combination, with a rotary spindle for carrying the work, of two slides carrying a cutter or cutters, and adapted to move, one in a longitudinal direction or parallel with the axis of said spindle, and the other in a direction transverse thereto, for producing corresponding movements of said cutter or cutters, cams whereby the two slides are moved to carry the cutter or cutters mounted upon them away from the work, and springs or weights applied one to each slide for moving said slides automatically in the opposite direction to apply the cutter or cutters to the work. I also combine with the above rotary gage-wheels having portions of various projection, which regulate or control the distances to which the two slides may be moved by their springs or weights at each cut, and which therefore correspondingly vary the forms of the articles produced. After each cut the slides are both moved back to a common starting-point, and either slide may be arrested or stopped by its gage-wheel at any point in its movement, thus causing the other slide to move alone in a straight line, either parallel with or transverse to the axis of the rotary spindle, for producing either a straight cylindric or peripherical cut upon the work, or a facing cut, according as one or the other of the rests is arrested or stopped and held stationary. I also combine with the other parts of the lathe devices whereby the cams for moving the slides are automatically stopped at any predetermined time after a sufficient number of cuts have been made to complete the work, as more fully hereinafter described.

In the accompanying drawings, Figure 1 represents a plan view of a machine embodying my invention. Fig. 2 represents a side elevation thereof, looking from the left toward the right hand. Fig. 3 represents a transverse vertical section of the machine upon the dotted line $x\ x$, Fig. 1, looking in the direction indicated by the arrows; and Fig. 4 represents a sectional view of a portion of the annular part of a watch-case upon an enlarged scale.

Similar letters of reference designate corresponding parts in all the figures.

Although my invention is applicable to lathes or machines for turning various articles, I have here represented the several parts constructed and organized for the turning of the annular parts or centers of watch-cases.

Referring to Fig. 4, A designates the annular portion or center of a watch-case which it is desired to turn. The inner surface, $a$, thereof may be bored out or turned in any suitable or common way, and the surfaces $b\ b'\ b^2\ b^3\ b^4\ b^5\ b^6$ are to be turned in my improved machine. To do this the following cuts are to be made, viz: first, a facing cut across the surface $b$ transverse to the axis; second, a facing cut across the surface $b^2$, the surface $b'$ being turned at the same time by the end of the cutter; third and fourth, two cylindric or peripherical cuts across the surface $b^3$, one after the other; fifth, a facing cut across the surface $b^4$, the surface $b^5$ being turned by the end of the cutter; and, sixth, a facing cut across the surface $b^6$. Six cuts are therefore necessary.

Turning, now, to a description of the machine, B designates a bed or base plate, and C designates a head-stock erected thereon and carrying a spindle, D, which is rotated by a belt upon the pulleys D'. The spindle D carries a chuck, $D^2$, whereon the ring or piece A is placed to be turned.

E and F designate two single slides or rests, which are arranged one upon the other, and the upper slide or rest, F, carries a tool-post, G, which has a rotary adjustment, and carries two cutters, c c', or a single cutter, as may be necessary. The two slides or rests E F each have an independent movement; but obviously the movement of the lower slide or rest, E, produces a corresponding movement of the upper slide or rest, F, while the latter has its own independent movement. The lower slide or rest, E, is adapted to move in a longitudinal direction parallel with the axis of the spindle D, and the upper rest, F, is adapted to move in a direction transverse thereto or transverse to the spindle D. The two slides or rests are adapted to move upon dovetailed guides or slideways, as shown in Fig. 3, in a manner similar to that in which all lathe-rests are moved. In Fig. 1 the two slides are represented as returned nearly to their normal position or starting-point, the rest F being moved at its greatest distance away from the axis of the spindle D and the rest E at nearly its extreme left position. The rest E is acted upon by a spring, d, (shown in Fig. 3,) which exerts a constant tendency to move the rest in the direction of the arrow 1, (shown in Fig. 1,) or toward the right, and the rest F is acted upon by a spring, e, (shown in Fig. 3,) which exerts a constant tendency to move the rest in the direction of the arrow 2, (shown in Fig. 1,) or inward toward the axis of the spindle D. In lieu of the spiral springs d e here represented, springs of other form, or their equivalents, weights, might be used.

H designates a shaft arranged parallel with the spindle D, which is rotated by a worm-shaft or screw, I, engaging with a worm-wheel, H', thereon. The shaft I derives rotary motion by means of belts J J' and a counter-shaft, J², from the spindle D, as clearly represented in Fig. 1.

Upon the shaft H are fitted two cams, K L, the former of which is arranged to operate upon the lower rest, E, while the latter is arranged to operate on the upper rest, F. These two cams move the rests E F against the force of their springs d e to carry the cutters c c' away from the work; and it will be readily understood that the two rests are advanced in the directions indicated by the arrows 1 and 2 as fast as such movements are permitted by the cams, the said rests following the cams in their let-off movements. The rests E F are moved to cause the cutters c c' to make one cut, and are returned to their starting-point at each revolution of the cam-shaft H, and as six cuts are necessary to complete the work the shaft H should make six revolutions, after which it is desirable to stop it to prevent further operation of the machine until a new piece of work is placed therein. The bearing f, which supports the inner end of the shaft I, is adapted to slide away from the shaft, and thereby permit the worm to drop out of the worm-wheel H' and stop the shaft H.

M designates a cam adapted to rotate in a horizontal plane and to move back the bearing f at each revolution. Upon the cam M are six teeth, g, and upon the shaft H is a cam consisting of a disk, h, having in it a pin, h'. At each revolution of the shaft H the pin h' acts upon one of the teeth g and moves the cam M ahead one-sixth of a turn; and at the sixth revolution of said shaft the cam is moved so as to slide back the bearing f and drop the shaft I. The movable bearing and its shaft constitute what may be regarded as a clutch, and in lieu thereof any other form of clutch may be used to stop the shaft H after a number of revolutions corresponding with the number of cuts to be made.

I desire to have it understood that the amount of movement of the rests E F permitted by the cams K L is the same at each revolution of the cams, and should be sufficient to enable the cutters c c' to move far enough in both directions to complete any of the cuts to be made.

N O designate two gage-wheels, which are respectively carried by the rests E F, and which each have arms or projections of different lengths, equal in number to the number of cuts to be made—in the present example of my invention, six. These gage-wheels have a step-by-step rotary movement imparted to them by spring-actuated pawls i j, attached to the parts upon which the rests slide, and respectively acting on ratchet-teeth in the gage-wheels N O, equal in number to the number of projections on said wheels. As the rests E F are moved back by the cams K L the gage-wheels N O engage with their pawls i j, and are turned one sixth of a turn, and the rests move forward under the influence of their springs d e until the arm or projection on one or the other of the gage-wheels strikes against a stationary stop, which may consist of the end of the guide on which the rest slides, whereupon that rest is stopped, while the other rest continues its forward movement.

In the operation of my machine the form given to the finished article depends solely on the relative lengths of corresponding projections in the two gage-wheels N O. For example, when the surface b of the piece A is to be faced, both the rests E F move inward under the pressure of their springs d e until the cutter c comes opposite that part. At this time the projection on the wheel N strikes its stop and the rest E can move no farther, after which the rest F moves straight inward and the cutter c faces the surface b, and both rests are then returned to their starting-point. At the next operation the rests move together until the cutter c is opposite the surface b², when the rest E is stopped by its gage-wheel N, while the rest F moves directly inward, causing the cutter c to finish the surfaces b' b², after which both rests return to the starting-point. At the third and fourth operations the rests both move toward the work until the gage-wheel O arrests the rest F, whereupon the rest E moves in a direction parallel with the spindle D, and the cutter c makes two cuts over the cylindric portion b³. At the fifth and sixth operations the rest E is arrested first, and the rest F then moves directly inward, making at the fifth operation the cuts $b^4$ $b^5$, and at the sixth operation the facing cut $b^6$, which completes the work. A new piece is then placed in the machine and the operation repeated.

By my invention I provide a very desirable machine, which is automatic in its action, and which will produce exact duplicates of the pattern required.

What I claim as my invention, and desire to secure by Letters Patent, is—

1. The combination, with a rotary spindle and the two slides carrying a cutter or cutters, one of which slides has a movement parallel with the axis of said spindle and the other a movement transverse thereto, whereby the cutter or cutters may be moved in both directions, of springs or weights applied one to each slide for moving said slides inward automatically to apply the cutter or cutters, and cams for moving said slides in the opposite directions against said springs or weights, substantially as and for the purpose specified.

2. The combination, with the rotary spindle and two slides carrying a cutter or cutters, one of which slides has a movement parallel with the axis of the spindle and the other a movement transverse thereto, whereby the cutter or cutters may be moved in both said directions, of springs or weights applied one to each slide for moving said slides inward automatically to apply the cutter or cutters, cams for moving said slides in the opposite directions, and gage-wheels having projections of different lengths for controlling and limiting the inward movements of said slides, substantially as and for the purpose specified.

3. The combination of the spindle D, slides E F and their actuating springs or weights, cams K L, gage-wheels N O, and pawls $i$ $j$, all substantially as and for the purpose specified.

4. The combination, with the rotary spindle and two slides, carrying a cutter or cutters, one of which slides has a movement parallel with the axis of the spindle and the other a movement transverse thereto, whereby the cutter or cutters may be moved in both said directions, of springs or weights for moving said slides inward to apply the cutter or cutters, a shaft and cams thereon for moving said slides in the opposite directions, and a device for automatically disengaging said shaft from its driving mechanism, all substantially as and for the purpose specified.

JACQUES LAURENT.

Witnesses:
FREDK. HAYNES,
ED. MORAN.